United States Patent [19]
Jackson

[11] Patent Number: 5,999,186
[45] Date of Patent: Dec. 7, 1999

[54] REFERENCE BASED PARAMETRIC DIMENSIONING METHOD AND SYSTEM

[75] Inventor: Geoff Jackson, Holyport, United Kingdom

[73] Assignee: 3-Design L.L.C., Jackson, Miss.

[21] Appl. No.: 08/862,608

[22] Filed: May 23, 1997

[51] Int. Cl.$^6$ .................................................. G06F 15/00
[52] U.S. Cl. ........................................ 345/420; 345/427
[58] Field of Search ................................ 345/419–421, 345/433, 355, 435, 427, 443, 438, 473, 326, 329, 340, 173; 382/232, 284, 294

[56] References Cited

U.S. PATENT DOCUMENTS

| | | | |
|---|---|---|---|
| 4,622,641 | 11/1986 | Stephens | 364/518 |
| 4,879,667 | 11/1989 | Gorski et al. | 364/522 |
| 4,882,692 | 11/1989 | Saxton et al. | 364/518 |
| 4,901,250 | 2/1990 | Ishida | 345/355 |
| 4,933,865 | 6/1990 | Yamamoto et al. | 364/518 |
| 4,951,227 | 8/1990 | Todd | 364/518 |
| 5,197,120 | 3/1993 | Saxton et al. | 345/439 |
| 5,265,197 | 11/1993 | Kondo | 395/120 |
| 5,268,999 | 12/1993 | Yokoyama | 395/141 |
| 5,297,241 | 3/1994 | Hirr et al. | 345/427 |
| 5,412,762 | 5/1995 | Kondo | 395/120 |
| 5,437,008 | 7/1995 | Gay et al. | 395/161 |
| 5,517,607 | 5/1996 | Nishimura et al. | 395/160 |
| 5,548,698 | 8/1996 | Smith et al. | 395/139 |
| 5,548,706 | 8/1996 | Koizumi et al. | 395/161 |
| 5,577,189 | 11/1996 | Gay et al. | 395/326 |
| 5,729,750 | 3/1998 | Ishida | 395/63 |

OTHER PUBLICATIONS

D. Gossard, et al., "Representing Dimensions, Tolerances, and Features in MCAE Systems," IEEE Computer Graphics and Applications, vol. 8, No. 2, Mar. 1, 1988, pp. 51–59.

A. Bond et al., "Rule–Based Automatic Dimensioning," Engrais Phosphates, No. 187, Jun. 2, 1987, pp. 128–135.

R. Light et al., "Modification of Geometric Models Through Variational Geometry," Computer Aided Design, vol. 14, No. 4, Jul. 1982, pp. 209–214.

Primary Examiner—Mark K. Zimmerman
Assistant Examiner—Chantë E. Harrison
Attorney, Agent, or Firm—Finnegan, Henderson, Farabow, Garrett & Dunner, L.L.P.

[57] ABSTRACT

The described CAD system enables a drafter to easily enter dimension entities, which describe the physical dimensions of an object in a CAD drawing or model. The dimension entities define either linear, angular, or radial dimensions, and for each dimension entity, the user defines a reference origin in addition to the normal dimensional information. The value of each defined dimension entity may be a simple constant, a parameter, or an expression of multiple constants and parameters. By virtue of the added reference origin, a very complex network of related dimension entities can be simply defined and easily modified. The recalculation of the dimension entities is performed by a parametric dimensioning engine that transforms groups of entities from the global space of the general CAD drawing or model into a local space. While in local space, the parametric dimensioning recalculates the coordinate data of the entities.

21 Claims, 15 Drawing Sheets

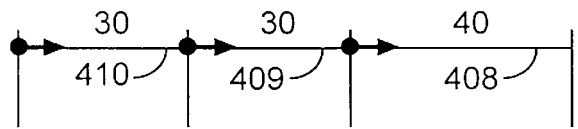

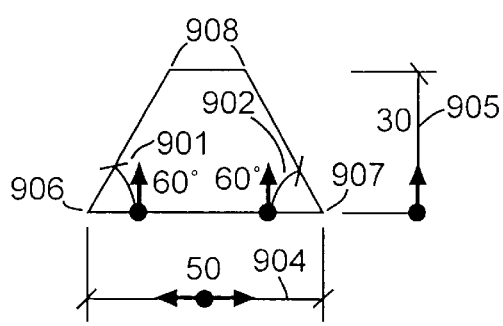
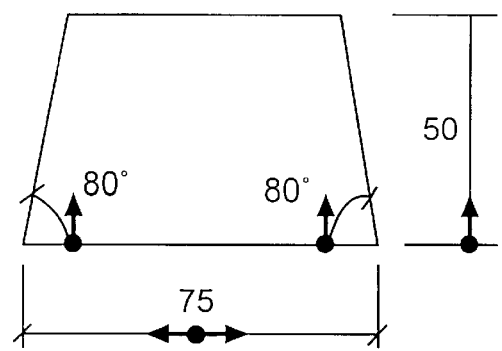
*FIG. 9A*      *FIG. 9B*
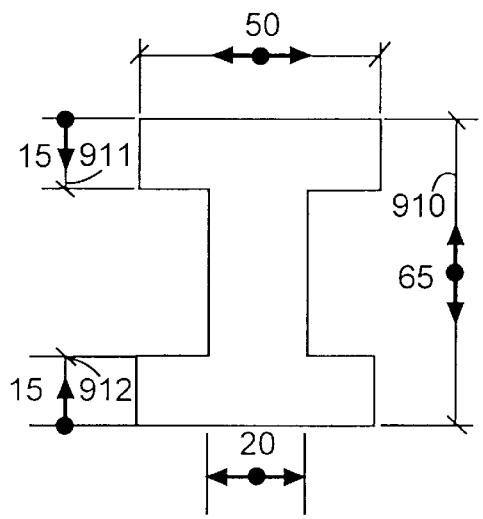
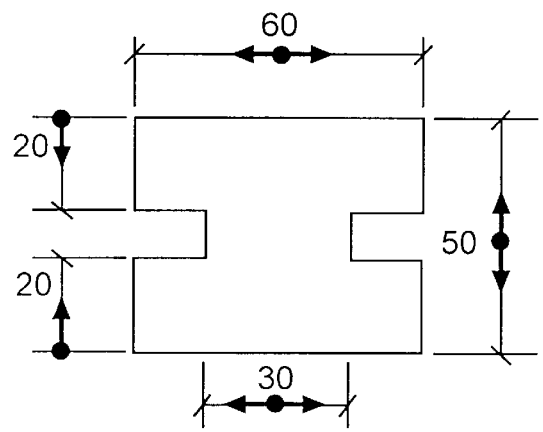
*FIG. 9C*      *FIG. 9D*
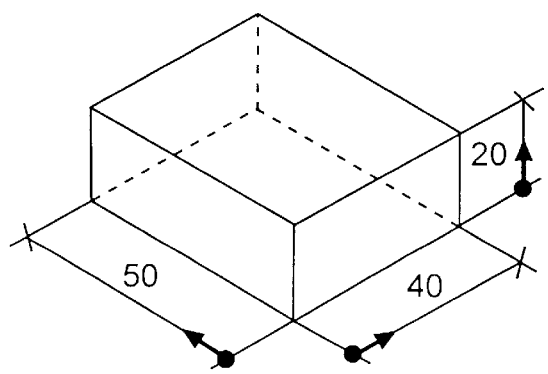
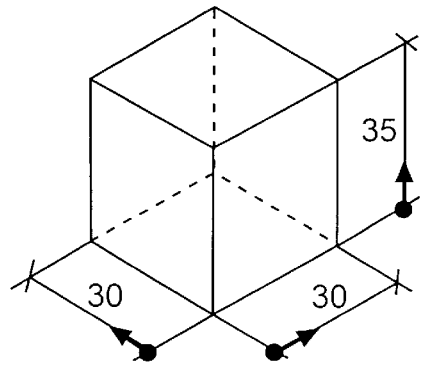
*FIG. 9E*      *FIG. 9F*

REFERENCE BASED PARAMETRIC DIMENSIONING METHOD AND SYSTEM

BACKGROUND OF THE INVENTION

The present disclosure relates generally to methods and apparatus for a computer aided drafting and design system, and more particularly, to the representation of objects in such a system. Computer aided design (CAD) systems use computers to assist in the design and testing of parts for a variety of applications ranging from large mechanical structures to tiny integrated circuits. CAD systems are equipped with efficient computer equivalents of many common drawing and drafting tools, thus liberating the user from countless tedious drafting details. An important time saving feature of many CAD systems is that sectional views and other auxiliary views can be automatically generated by the computer from an existing view, and the object being worked on can be automatically resized or rotated.

Typically, the user of the CAD system (the "drafter") enters a visual representation of the object(s) under design into the computer using the interface of the particular CAD system, and the CAD system stores the object(s) and their associated dimensions in a specialized format. The choice of format used to store the object(s) is not a trivial one. In particular, it is desirable to easily manipulate the dimensions of an object, and to easily identify and manipulate groups of related dimension parameters, such as groups of related dimension lines. For example, if one desires to enlarge the 2×2 square shown in FIG. 1A to the 4×4 square shown in FIG. 1B, one way to do it is to manually change the dimension and the position of each line in the square. Another equivalent way, supported by most CAD systems, is to specify to the CAD system the four lines to be modified, and then to scale the dimension of each line by a factor of two. However, in addition to selecting the four lines, it is also necessary to specify the final position of the scaled square, or a point about which to scale the selected object. Otherwise, merely scaling the lines could result in ambiguous results, as shown in FIGS. 1C and 1D.

As illustrated above, conventional CAD systems may require the drafter, when modifying an object, to tediously manipulate dimension lines of each entity (e.g., lines, circles, arcs, text) of the object, such as the manipulation of the dimension of each line of the square shown in FIG. 1A. Attempts have been made to correlate related dimensions and thus automate the modification of the related dimensions. For example, U.S. Pat. No. 5,548,706 to Koizumi et al. discloses a CAD system for manipulating multiple, parallel dimension lines. In Koizumi et al., the CAD operator selects one of the parallel lines as the "objective dimension line," and defines a reference point of the objective line (defined as beginning, middle, or end) to make subsequent changes. Subsequent changes to the objective dimension line (such as scaling) are also made to the other parallel dimension lines based on the reference point chosen for the objective line. Systems as described in Koizumi et al. are limited, however, in that because only one line is defined as an objective dimension line, only a single parameter can be used to describe multiple dimension lines. Further, the concept described in Koizumi et al. is only applicable to linear dimensions while CAD systems often specify objects with other, non-linear dimensional information such as angular dimensions.

Thus, there is a need for a CAD system method and apparatus which provides the capability to efficiently and conveniently dimension and manipulate related geometrical entities of an object in both two and three dimensions.

SUMMARY OF THE INVENTION

The present invention is a system and method for defining and representing dimensions of an object. The advantages and purposes in accordance with this the invention will be set forth in the following description and will also be obvious from the description, or may be learned by practicing the invention. The advantages and purpose of the invention will be realized and attained by means of the elements and combinations particularly pointed out in the appended claims.

To obtain the advantages, and in accordance with the purpose of the invention, as embodied and broadly described herein, one embodiment of the invention is a method of updating dimension entities of an object in a computer aided design (CAD) program, each dimension entity having coordinate data. The method includes the steps of (1) forming chains of related dimension entities; (2) sequentially recalculating the coordinate data of the dimension entities in a selected chain such that a modification of a subsequent dimension entity in the selected chain is influenced by modifications to previous dimension entities in the chain; and; and (3) regenerating the entities on a computer display based on the modified dimensions.

Other embodiments of the present invention define a computer system executing a program in accordance with the present invention, a data structure storing dimension information in accordance with the present invention, and a computer program stored on computer-readable media for implementing the method of the embodiment discussed in the previous paragraph.

A still further embodiment of the present invention includes a method of recalculating coordinate information of entities in a CAD object defined in a global coordinate system. This method includes the steps of (1) identifying one or more local coordinate systems; (2) transforming the coordinates of the entities in the CAD object to one of the local coordinate systems; (3) forming angular dimension entity chains in the local coordinate system; (4) forming linear dimension entity chains in the local coordinate system; (5) regenerating the coordinate information of the entities in the local coordinate system based on the formed angular and linear dimension entity chains; and (6) transforming the regenerated coordinate information in the local coordinate system to the global coordinate system. A related embodiment is a computer program stored on computer-readable media for implementing this method.

Both the foregoing general description and the following detailed description are exemplary and explanatory only and do not restrict the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

FIGS. 9A–9E are diagrams illustrating entities defined with the dimensioning system of the present invention;

DETAILED DESCRIPTION

Reference will now be made in detail to the embodiments of the invention, examples of which are illustrated in the accompanying drawings. Wherever possible, the same reference numbers will be used throughout the drawings to refer to the same or like parts. For the reader's convenience, Table I (located at the end of this section of this disclosure) summarizes the definitions of certain terms used in this disclosure.

This disclosure describes a CAD system through which a drafter can easily enter dimension entities that describe components of the entire CAD object. The components of the object may be simple geometrical entities (e.g., lines, arcs, circles, text) or more complex components defined as an aggregate of simple entities, such as two-dimensional or three dimensional objects specified to a particular application (e.g., a steel beam, a mechanical part, an electrical component). The dimension entities entered for the components may be either linear, angular, or radial, and for each dimension entity entered, the drafter defines a reference origin having a direction, in addition to the normal dimension information. By virtue of the added dimension information, a very complex network of related dimension entities and their corresponding component entities can be simply defined and easily modified.

Figure 1A:
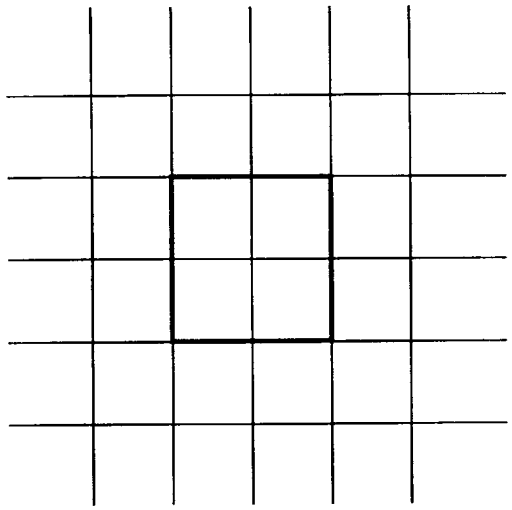
FIGS. 1A–1D are diagrams illustrating scaling of a 2×2 square.
Figure 1B:
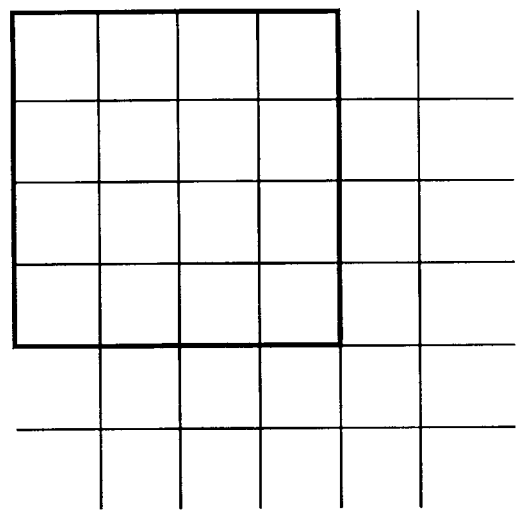
Figure 1C:
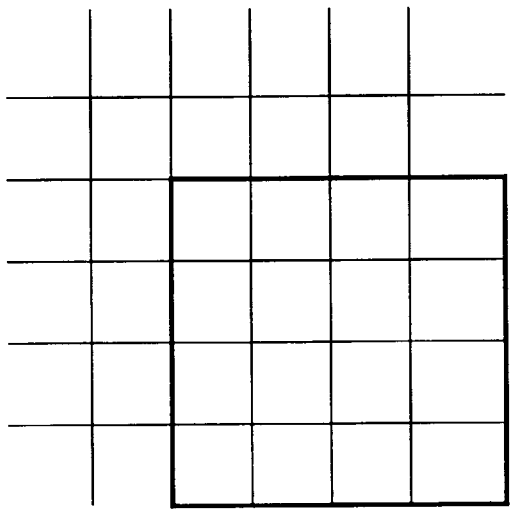
Figure 1D:
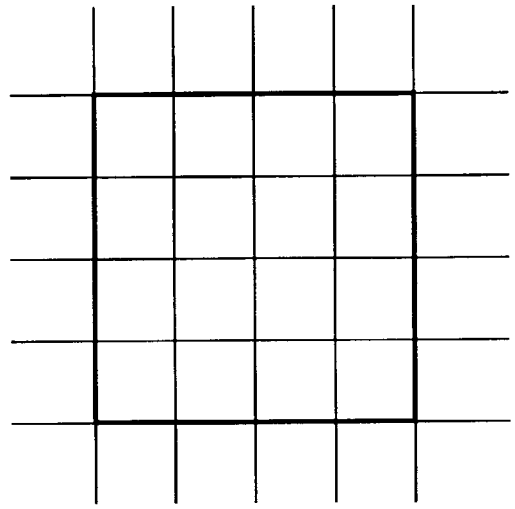
Figure 2:
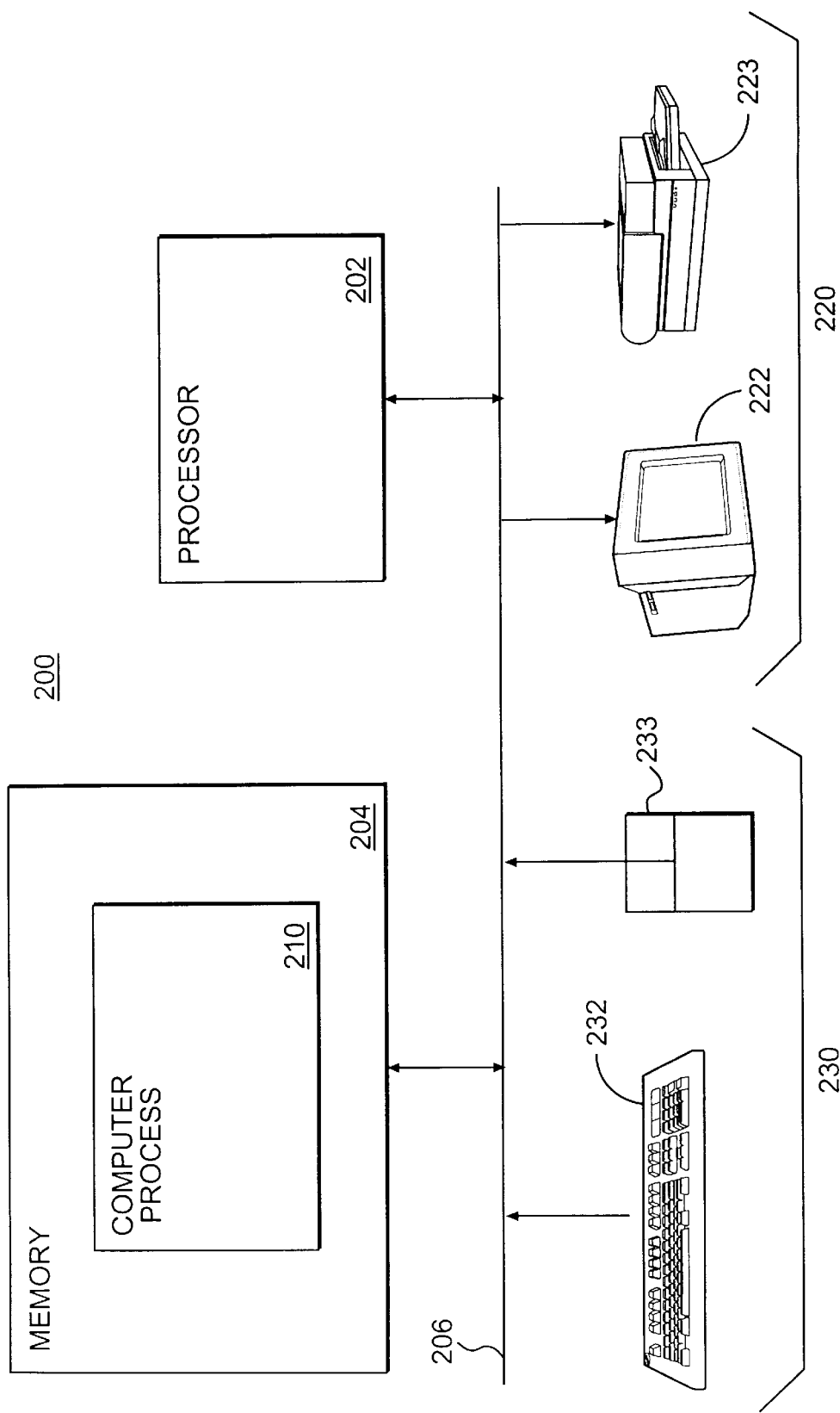
FIG. 2 is a block diagram of an exemplary computer system on which the present invention may be implemented.

FIG. 2 is a block diagram of an exemplary computer system 200 on which the present invention may be implemented. Computer system 200 includes a processor 202 and a memory 204 coupled to processor 202 through a bus 206. Processor 202 fetches computer instructions from memory 204 and executes the fetched computer instructions. Processor 202 also reads data from and writes data to memory 204 and sends data and control signals through bus 206 to one or more computer output or display devices 220 and receives data and control signals through bus 206 from one or more computer input devices 230 in accordance with fetched and executed computer instructions.

Memory 204 can include any type of computer memory, including, without limitation, randomly accessible memory (RAM), read-only memory (ROM), and storage devices which include storage media such as magnetic and/or optical disks. Memory 204 includes a computer process 210, which executes within processor 202 from memory 204. A computer process is a collection of computer instructions and data that collectively define a task performed by computer system 200. Computer process 210 may be, for example, a CAD program including a dimensional system operating in accordance with the present invention.

Computer output and display devices 220, shown as a cathode ray tube (CRT) 222 and a printer 223, may be any type of computer output device, additionally including, without limitation, a light-emitting diode (LED) display or a liquid crystal display (LCD). Each of computer output devices 220 receives control signals and data from processor 202 and, in response to such control signals, displays or prints the received data. Computer output devices 220, and the control thereof by processor 202, are conventional.

User input devices 230, shown as a keyboard 232 and a mouse 233, may be any type of user input device, additionally including, without limitation, a numeric keypad, and a pointing device such as a trackball, lightpen, touch-sensitive pad, digitizing tablet, thumb wheels, or joystick. Each of user input devices generates signals in response to physical manipulation by a user and transmits those signals through bus 206 to processor 202.

Figure 3:
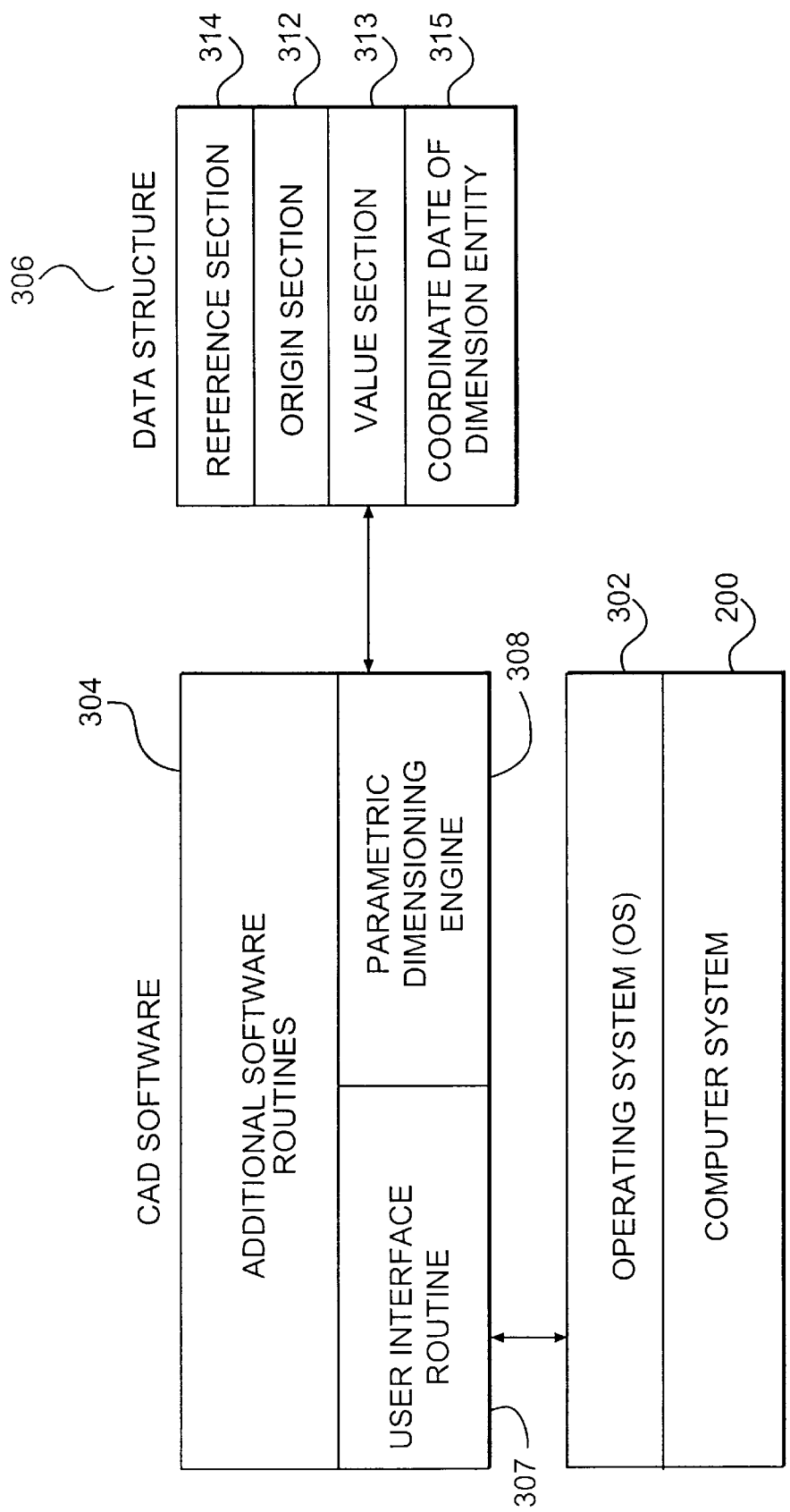
FIG. 3 is a block diagram illustrating the high-level functional components of a CAD software system constructed according to the present invention.

FIG. 3 is a block diagram illustrating the high-level functional components of a CAD software system constructed according to the present invention. An operating system 302 interfaces application programs, such as a CAD program 304, with the hardware of computer system 200. CAD program 304 may be visualized as an aggregate of a number of software routines, including a user interface routine 307, which defines how the user will input information to the CAD system. User interface 307 allows the user to enter drawing entities (lines, shapes, etc.) and a corresponding dimension of each drawing entity (i.e., a dimension entity), in accordance with the dimensioning scheme of the present invention. The entered dimension entity is preferably stored in a data structure such as data structure 306.

Data structure 306 includes, for each dimension entity, a number of sections, such as: origin section 312, which may identify the origin as one of a "start," "middle," or "end"; a value section 313, which stores the value of the dimension; a reference section 314, which references the dimension to the entity being dimensioned; and a coordinate data section 315, which stores the spatial location, in either two or three dimensions, of the dimension entity. Value section 313 may store a simple numerical constant (e.g., 100) or a more complex parameter referencing constants or variables defined by the drafter. For example, a parameter "span" could be defined to be the numeric constant "100" and a parameter "height" could be defined as being the expression "span/2".

A parametric dimensioning engine 308 contains algorithms, to be described in further detail below, for operating on the dimension information in data structure 306 and accordingly alters the coordinate data of the dimension entity and its referenced drawing entity. Specifically, parametric dimensioning engine 308 analyzes the dimension entities to determine related chains of dimension entities, and then recalculates, or regenerates, the coordinate data for each of the related dimension entities in the chain.

In a preferred embodiment, the invention is implemented on a Pentium based computer system using the Microsoft Windows NT operating system. Further, the dimension entities and the parametric dimensioning engine according to the present invention are preferably implemented in software as an enhancement to the AutoCAD CAD system.

Figure 4A:
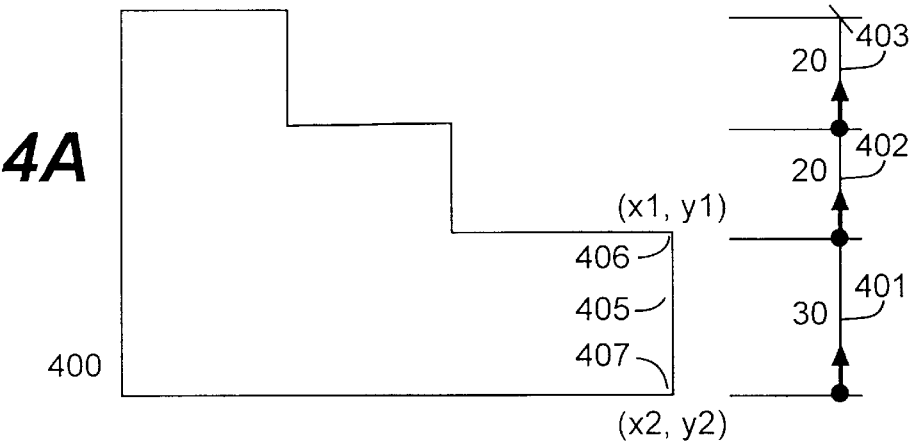
FIGS. 4A–4C are diagrams illustrating the fundamental dimensions used by a CAD system.

The fundamental dimensions used by CAD system 304 to describe objects are linear, angular, and radial. The size and location of geometrical primitive entities, such as lines, circles, and arcs, can be defined by linear, angular, or radial dimension entities or by combinations of them. As shown in FIG. 4A, an object 400 is constructed of eight lines, each with a set dimension (i.e., its length). In creating object 400, the drafter has specified object 400 with a number of dimension lines. Dimension lines 401, 402, and 403 fix the vertical (y) value of the points they reference, while dimension lines 408, 409, and 410 fix the horizontal (x) value of the points they reference. Line 405 of object 400 is defined by its end-points 406 (x1, y1) and 407 (x2,y2), which in turn depend on the value of dimension lines 401 and 408. Note that not every line in object 400 must have its dimension explicitly defined with a dimension line, as these lines may be defined relative to the end-points of other lines.

Each dimension line has associated with it constructs such as the leader lines of the dimension line, the text that displays the value of the dimension line (e.g., 30), and coordinate data indicating where the dimension information should be placed. The dimension line, leader line, text, and coordinate data is collectively referred to as a dimension entity.

Figure 4B:
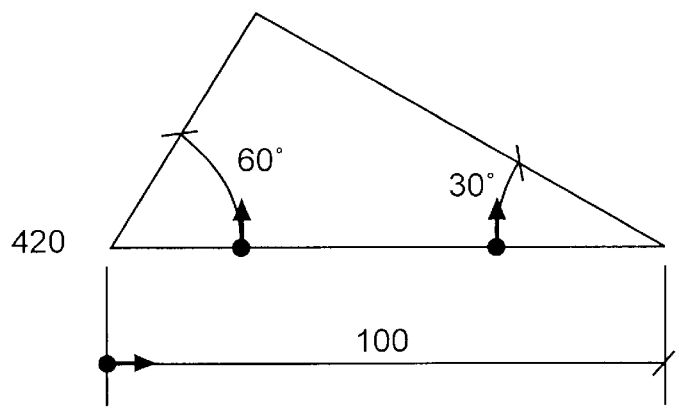

FIG. 4B illustrates angular dimensions. Unlike the lines of object 400, shown in FIG. 4A, which are exclusively specified based on points defined by linear distances between one another, dimension entities describing the lines in object 420 also include information about the relative angular positions of the lines.

Figure 4C:
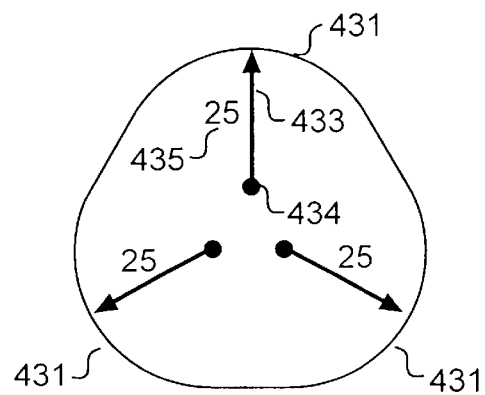

FIG. 4C illustrates radial dimensions. The radii of arcs 431, shown in FIG. 4C, are defined with radial dimensions. That is, each arc is specified as having a certain radius (e.g., 25) defined to extend from a point. Radial dimension entities contain information relating to the radial dimension line, such as line 433; the origin of the radial dimension line, such as origin 434, and the value of the radius, such as value 435.

According to the present invention, dimension entities describing components of CAD objects specified with the fundamental dimensions shown in FIGS. 4A–4C additionally include a reference origin. The reference origin allows the geometrical variation of groups of related dimension entities, and their associated object entities, to be controlled.

Figure 5A:
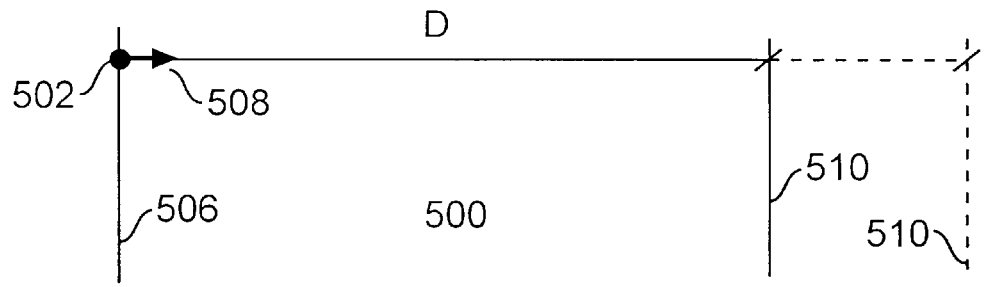
FIGS. 5A–5C are diagrams illustrating linear dimensions defined according to the present invention.
Figure 5B:
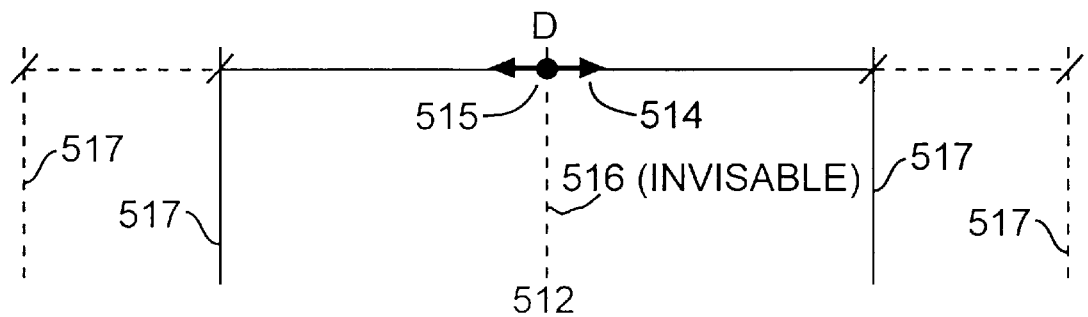
Figure 5C:
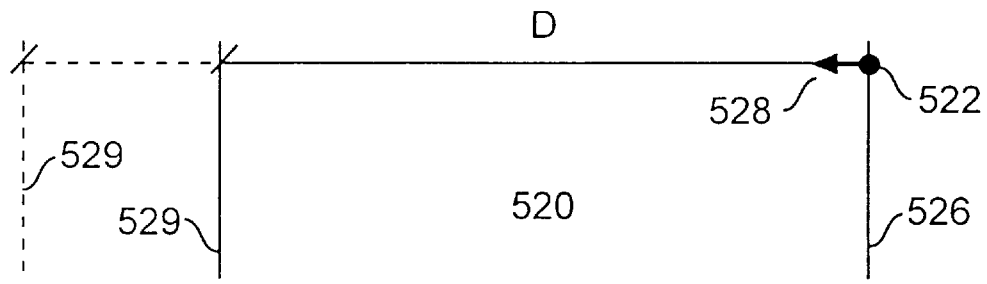

Linear dimension entities in accordance with the present invention are specified as having a reference origin at one of the start-point, mid-point, or end-point of the dimension line. FIGS. 5A through 5C illustrate such linear dimensions with the reference origin defined at the start-point in FIG. 5A, at the mid-point in FIG. 5B, and at the end-point in FIG. 5C.

Dimension line 500, shown in FIG. 5A, has a reference origin 502 and a length value D. In accordance with the present invention, the plane coincident with reference origin 502 and perpendicular to the direction of the dimension line, shown as plane 506, is called the dimension line's reference plane. Plane 510, coincident with the opposite end of dimension line 500 and perpendicular with dimension line 500 is called the dimension line's variable plane. Modifications to the length D of the dimension line are performed by extending the line in the direction of arrow 508. That is, changing D changes the position of variable plane 510, while the position of reference origin 502 remains fixed. Arrow 508 is a purely symbolic representation for the "direction" of the origin, thus allowing the drafter to easily visualize the reference origin.

FIG. 5B is a diagram illustrating a dimension line 512 defined in a manner similar to dimension line 500, but with the reference origin 515 defined at the midpoint of the line. As suggested by arrows 514, modifications to the length D of the dimension line are performed by extending the line both to the right and left, each for a length of D/2. Plane 516 is the reference plane of dimension line 512 and planes 517 are the variable planes of the dimension line.

FIG. 5C is a diagram illustrating a dimension line 520 with a reference origin defined at its right-most end. Dimension line 520 is similar to dimension line 500, except its reference origin 522 is defined at the end of the line opposite that of dimension line 500, and its direction, shown by arrow 528, is also in the opposite direction. Dimension line 520 includes reference plane 526 and variable plane 529.

Preferably, the reference origins and directions shown in FIGS. 5A–5C are assigned by the drafter when the dimension entity is defined. Additionally, although reference planes and variable planes are graphically shown in FIGS. 5A–5C, these planes are actually represented on the computer display as the leader lines of the dimension, i.e., the reference and variable planes are effectively the extrusion of the leader lines out of the page. Additionally, the graphical arrows shown in FIGS. 5A through 5C do not necessarily have to be pictorially represented on the computer display.

Linear dimension entities defined in accordance with the present invention, which include the above described origin information, may be chained together to form groups of related linear dimension entities. Chained linear dimension entities and their associated objects may be quickly and uniformly modified by the parametric dimensioning engine 308 with a single command from the drafter. Accordingly, dramatic dimensional changes can be made to a CAD drawing or model without requiring the drafter to manually modify each entity of the object.

Chaining of multiple dimensional lines, and the subsequent modification of a drawing or model made up of components dimensioned with multiple chained linear dimension entities will now be illustrated with reference to FIGS. 6 and 7.

Figure 6A:
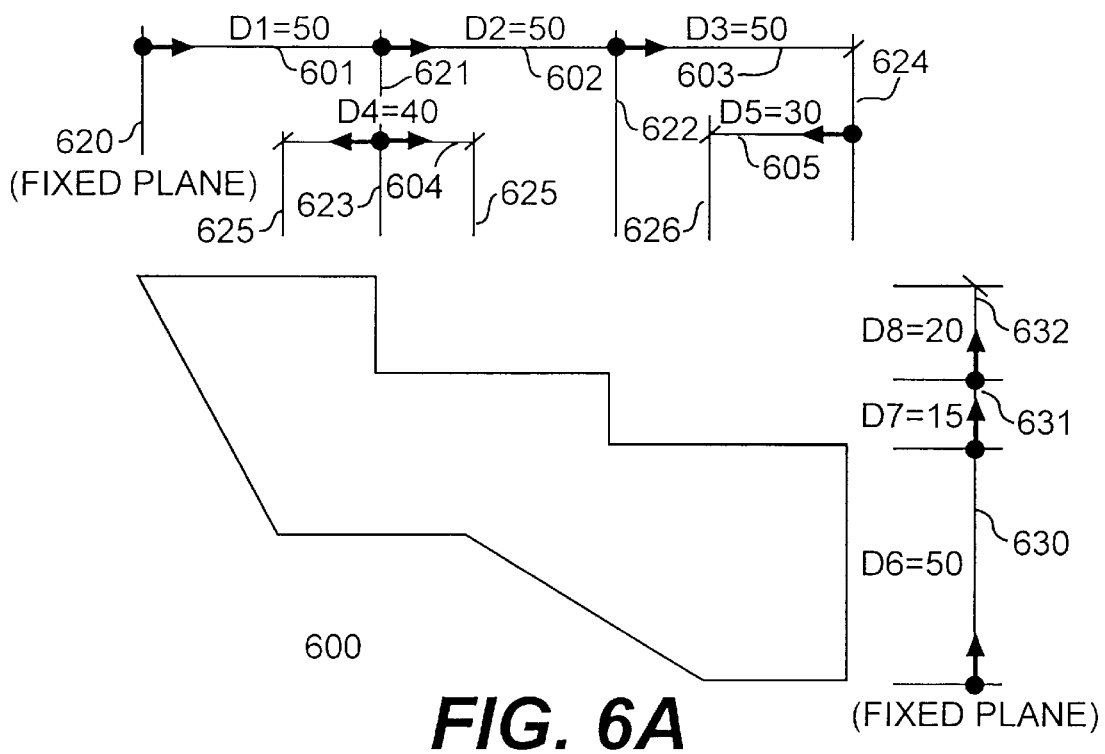
FIG. 6A is a diagram showing a CAD object having dimension lines defined according to a feature of the present invention.

FIG. 6A is a diagram showing an object 600 and its horizontal dimension lines 601, 602, 603, 604, and 605. These dimension lines have reference planes 620, 621, 622, 623, and 624, respectively, and variable planes 621, 622, 624, 625, and 626, respectively. The dimension information in the vertical direction is given by dimension lines 630, 631, and 632. The origin and direction of each dimension in FIG. 6A is shown graphically by the arrows with a circular base.

Dimension lines 601, 602, and 603 have their origins defined at their start; line 605 has its origin defined at its end; and line 604 has its origin defined at its midpoint. A dimension line is considered "chained" to another dimension line when either its reference plane is coincident with the variable plane of another dimension line or its variable plane is coincident with a reference plane of another dimension line. For example, as shown in FIG. 6A, the variable plane of dimension line 601 (i.e., plane 621) is coincident with the reference plane of dimension lines 602 and 604, the variable plane of dimension line 602 (plane 622) is coincident with the reference plane of dimension line 603, and the variable plane of dimension line 603 (plane 624) is coincident with the reference plane of dimension line 605. Because the reference plane of dimension line 601 (plane 620) is not coincident with the variable plane of another dimension line, dimension line 601 is the head of the chain and its reference plane 620 is called a fixed plane.

Parametric dimensioning engine 308 is capable of grouping dimensional lines into their respective chains even when no information is known a priori about the interrelationships of the dimensional lines. FIG. 7 is a flowchart illustrating such a process. A dimension line with a reference plane that is not coincident with a variable plane of another dimension line (i.e., a dimension line with a fixed plane) is located and selected (step 701). If the variable plane of the selected dimension line is coincident with a reference plane of a second dimension line, that second dimension line is determined to be a "child" line in the chain of dimensional lines (steps 703 and 704). The child line is then set as the selected dimension line and steps 702 through 704 are repeated. To determine all the dimension line chains, the process shown in FIG. 7 is repeated for each dimension line with a fixed plane. Additionally, dimension chains for alternate dimension orientations, such as for lines 631, and 632, in FIG. 6, may be independently determined.

Figure 7:
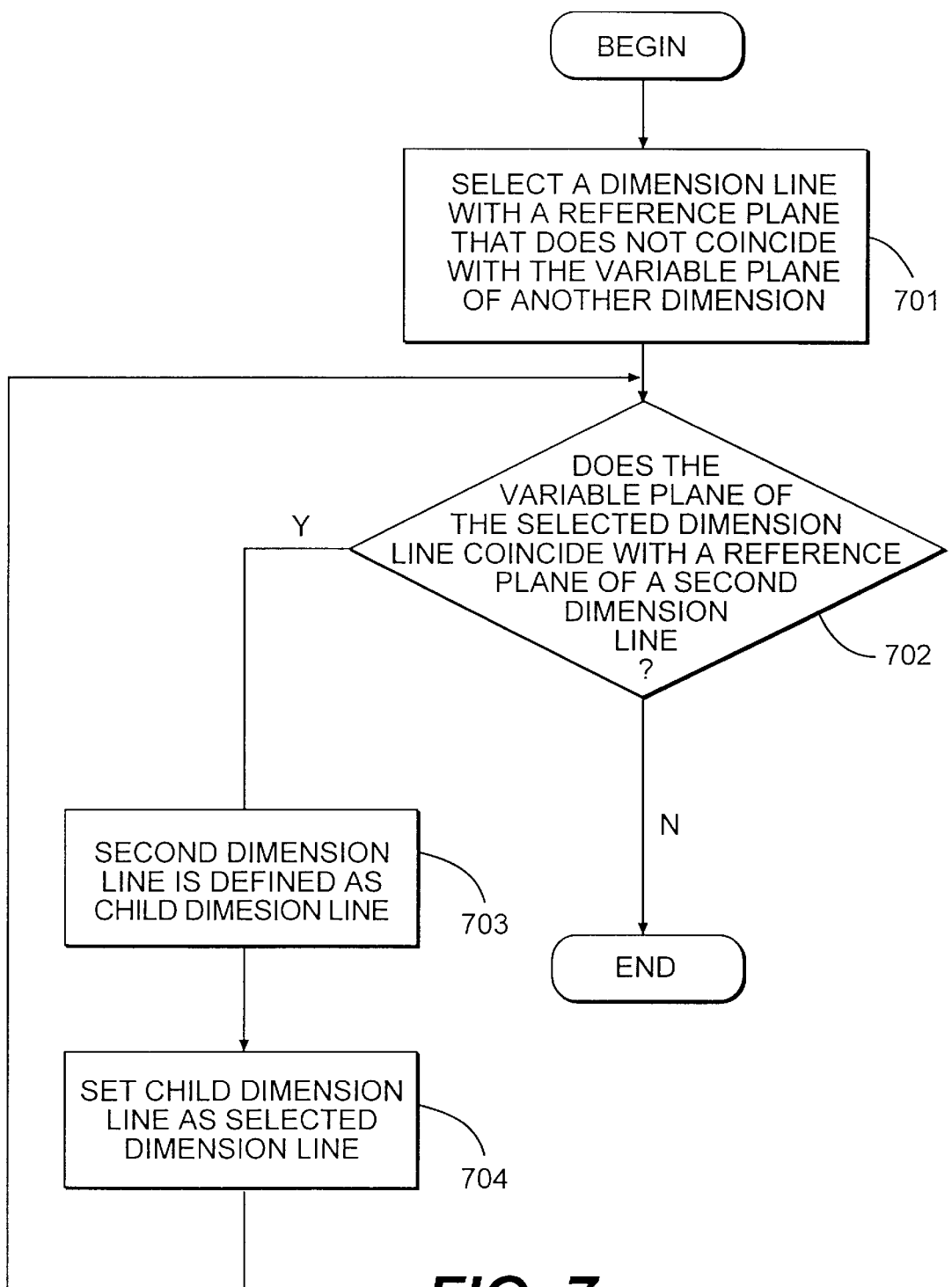
FIG. 7 is a flowchart illustrating grouping dimension lines into chains.

Once the system has determined the correct dimension line chains, either with the method of FIG. 7 or by storing the relational information as it is entered by the drafter, all or some of the dimension lines in a chain can be modified by the drafter, and the changes automatically implemented and reflected in the whole chain by parametric dimensioning engine 308. The parametric dimensioning engine sequentially steps through the modified chains, beginning with the dimension line with the fixed plane, and recalculates the coordinates of the entities as appropriate. Child reference lines have the coordinates of their origins automatically recalculated because they are defined relative to the variable plane of their parent dimension. The coordinates of the drawing entities containing the dimension lines and coordinates of the entities referenced by the dimension entities can then be mapped from the old dimension planes (i.e., the planes prior to the dimension parameter being changed) to the new dimensional planes. The regenerated network of entities is then redrawn on the computer screen.

The dimensional network shown in FIG. 6A will be used to illustrate the recalculation of a dimensional network by parametric dimensioning engine 308. Assuming the value of the fixed reference plane 620 to be zero, plane 621, as shown in FIG. 6A, has a value D1. The two variable planes of dimensional line 604 have the value (D1–D4/2) and (D1+D4/2). The variable plane of dimension line 602, plane 622, has the value (D1+D2), and plane 624 has the value (D1+D2+D3). Plane 626 has the value (D1+D2+D3–D5). If, for example, the user were to modify D3 to a new value, say D3', only the position of planes 624 and 626, the planes dependent on D3, would change.

Figure 6B:
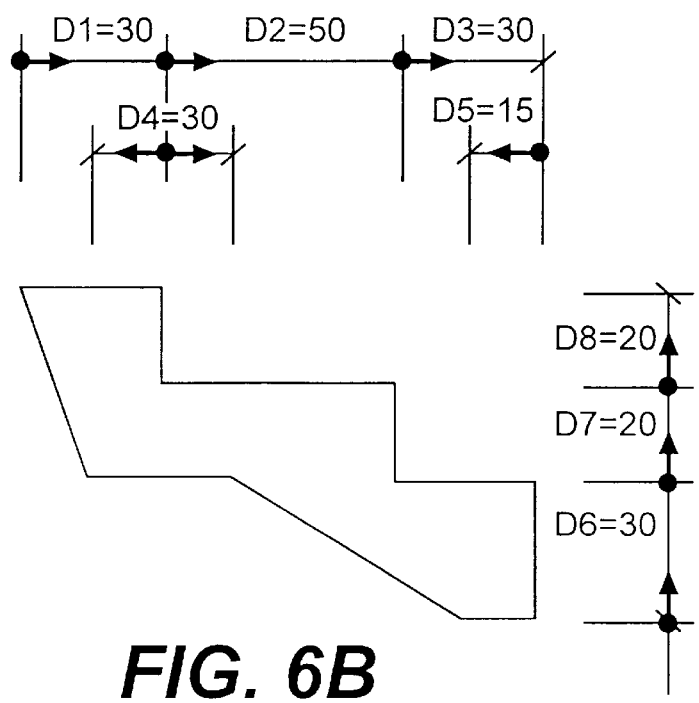
FIG. 6B is a diagram of the CAD object of FIG. 6A with modified dimensions.

FIG. 6B illustrates object 600, shown in FIG. 6A, regenerated and redrawn after the values D1 through D8 have been modified as shown. For simplicity, the dimension line values shown in FIGS. 6A and 6B are simple numeric constants, however, the drafter may define the dimension values using more complex expressions. For example, the drafter may define D1 as "A," D2 as "A" plus "B," and D3 as two times "A." By modifying the parameters "A" and "B," new values for D1, D2, and D3 are determined. Accordingly, the drafter does not have to edit the individual dimension entities to introduce changes to the CAD drawing or model.

Although the examples of dimensional chains described so far have had their reference and variable planes all located in a single orientation in 3-D Cartesian space, different dimensional chains may have their planes located at different orientations in 3-D Cartesian space. For example, in FIG. 6A, the reference and variable planes of the linear dimension entities defining horizontal dimension lines 601, 602, 603, 604, and 605 could lie at a different orientation then the reference and variable planes associated with vertical dimension lines 630, 631, and 632.

When handling the mapping of entities within an object having chains of mixed orientation, parametric dimensioning engine 308 simply transforms all entities to the space of each chain prior to recalculation of their dimensions. Any points lying on the intersection of one or more planes will be transformed to their new location after the recalculation has been performed on all the chains. Inconsistencies resulting from one or more conflicting dimensions are detected and resolved by the parametric dimensioning engine, as explained below with reference to FIG. 16.

As described above, linear dimension entities defining entities of CAD objects may be simply and conveniently modified, and the modifications automatically applied to the chains of related dimension entities and the corresponding CAD components.

Figure 8A:
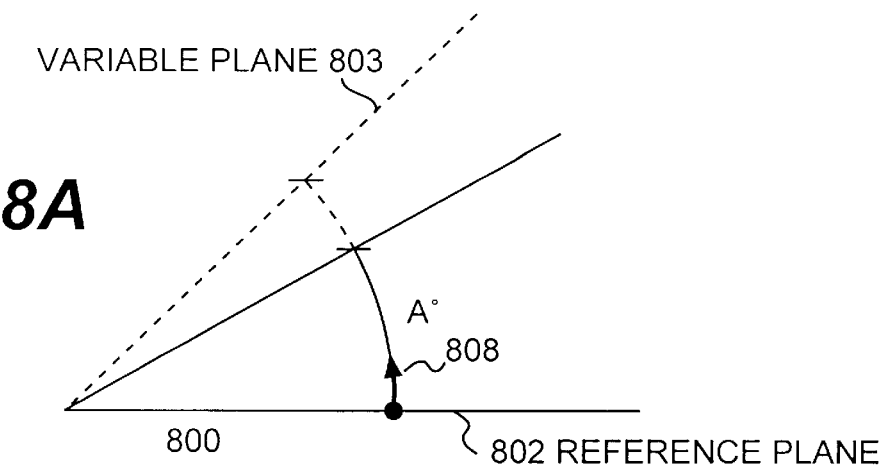
FIGS. 8A–8C are diagrams illustrating angular dimension defined in accordance with the dimensioning system of the present invention.
Figure 8B:
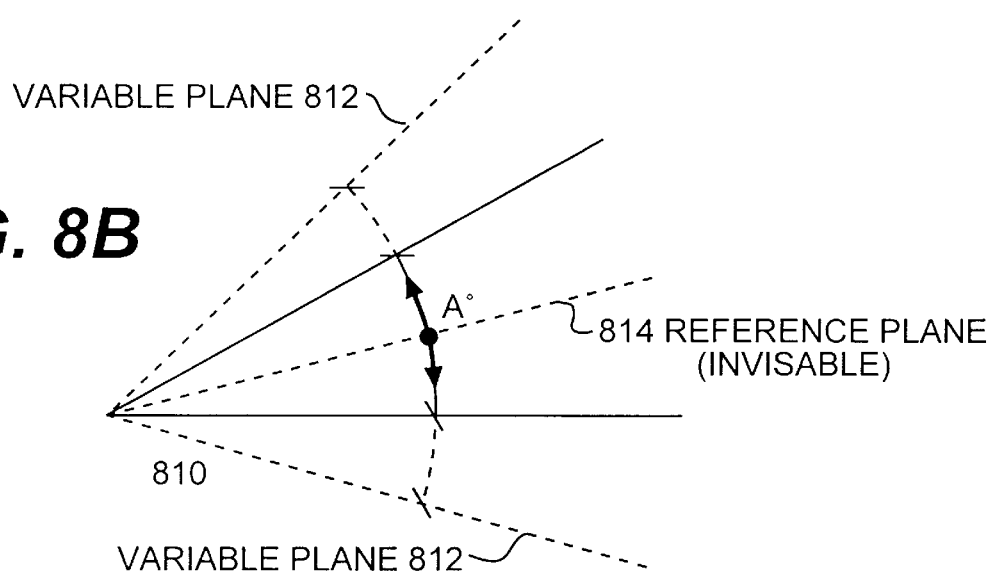
Figure 8C:
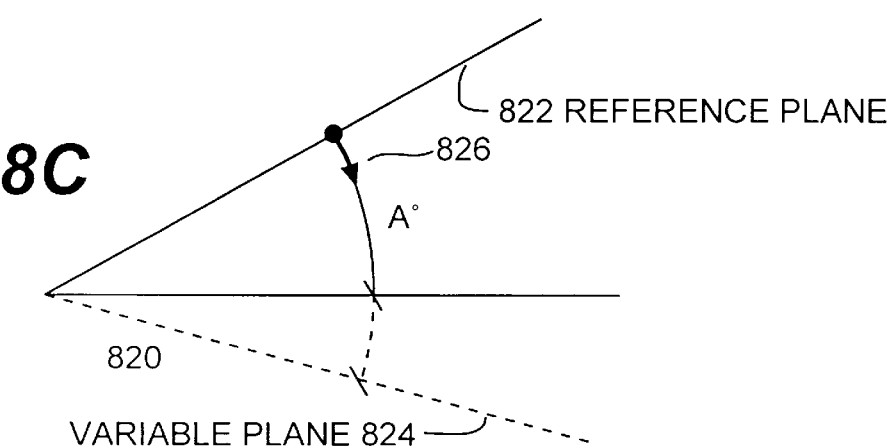

In addition to linear dimensions, in accordance with the present invention, angular dimensions and radial dimensions can be defined and manipulated. In a manner similar to linear dimensions, angular dimension entities in accordance with the present invention are specified as having a reference origin at one of the start, mid-point, or end of the angular dimension. FIGS. 8A through 8C illustrate such angular dimensions with the reference origin defined at the start in FIG. 8A, at the mid-point in FIG. 8B, and at the end in FIG. 8C.

Angular dimension 800, shown in FIG. 8A, includes a direction, shown by arrow 808 and a start origin, shown by reference plane 802. The position of its variable plane 803 changes according to the angle A. Unlike the variable and reference planes defined for linear dimensions, which are parallel for any given dimension, the angular variable and reference planes will intersect. Angular dimension 810, shown in FIG. 8B, is an example of an angular dimension with an origin at its mid-point. Each of variable planes 812 are formed an at angle (A/2) with reference plane 814. Angular dimension 820, shown in FIG. 8C, is an example of an angular dimension with an origin at its end. Angular dimension 820, which has a reference plane 822 and a variable plane 824, is similar to angular dimension 800, except that its direction, as shown by arrow 826, is opposite of the direction shown by arrow 808.

Many types of entities may be described by and manipulated using the linear and angular dimension entities of the present invention, examples of which are illustrated in FIGS. 9A through 9F. As shown in FIG. 9A, a parallelogram is defined with two angular dimensions 901 and 902, a horizontal linear dimension 904, and a vertical linear dimension 905. Point 906 is fixed by horizontal dimension 904, vertical dimension 905, and angular dimension 901. Similarly, point 907 is fixed by horizontal dimension 904, vertical dimension 905, and angular dimension 902. Points 908 are fixed by vertical dimension 905. To obtain the parallelogram shown in FIG. 9B, the drafter simply modifies the dimension values to the values shown in FIG. 9B. Parametric dimensioning engine 308 then regenerates the coordinates of the parallelogram and its associated dimension entities as shown.

FIG. 9C is a diagram illustrating an object defined with linear dimensions. Linear dimension 910 is at the head of a chain having child dimensions 911 and 912. The dimensions in this figure define distances between lines or line segments. FIG. 9D illustrates the object in FIG. 9C modified to the indicated new dimension values.

FIGS. 9E and 9F are diagrams illustrating three-dimensional objects defined with linear dimensions that indicate distances between planes.

Figure 10A:
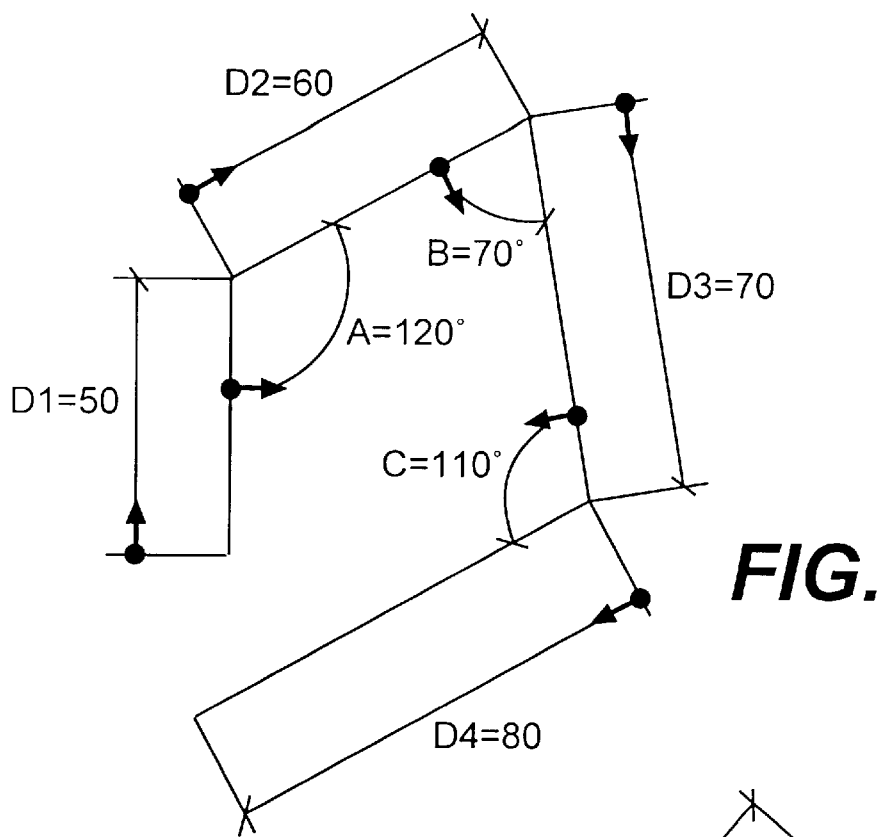
FIGS. 10A and 10B are diagrams illustrating chained angular dimensions defined in accordance with the dimensioning system of the present invention.
Figure 10B:
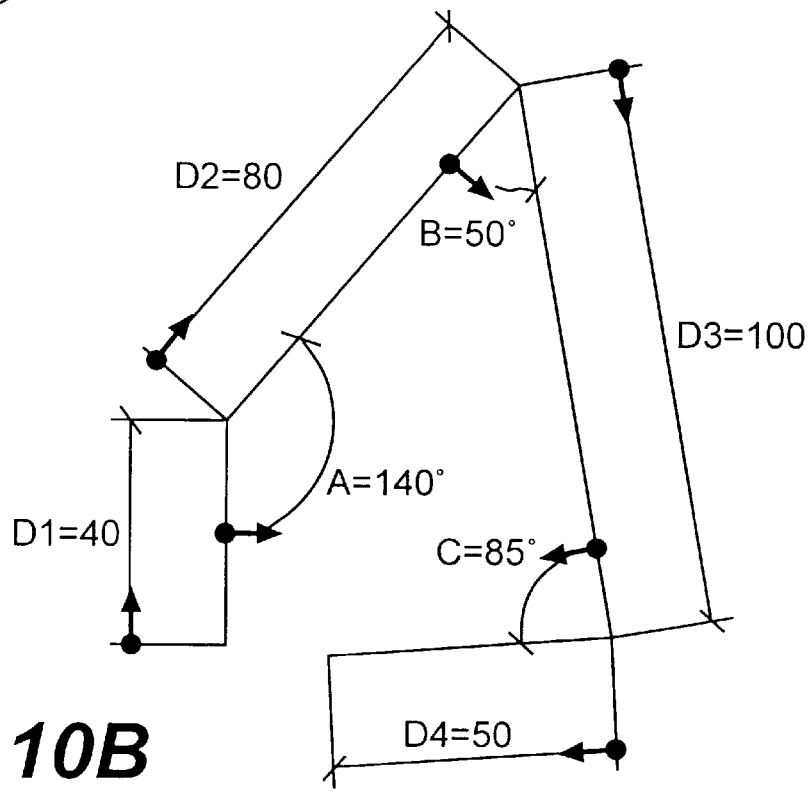

FIGS. 10A and 10B are diagrams illustrating chained angular dimensions according to the present invention. Angular chaining occurs when a variable plane of a first angular dimension is coincident with the reference plane of a second angular dimension. Angular dimensions "A", "B", and "C" are shown chained in FIG. 10A. Angular dimension "A" is the head of the angular dimension chain because its reference plane is not coincident with a variable plane of another angular dimension. FIG. 10B is a diagram showing the angular and linear dimensions of FIG. 10A after angles A, B, C and lengths D1, D2, D3, and D4 have been modified to the indicated values.

Figure 11:
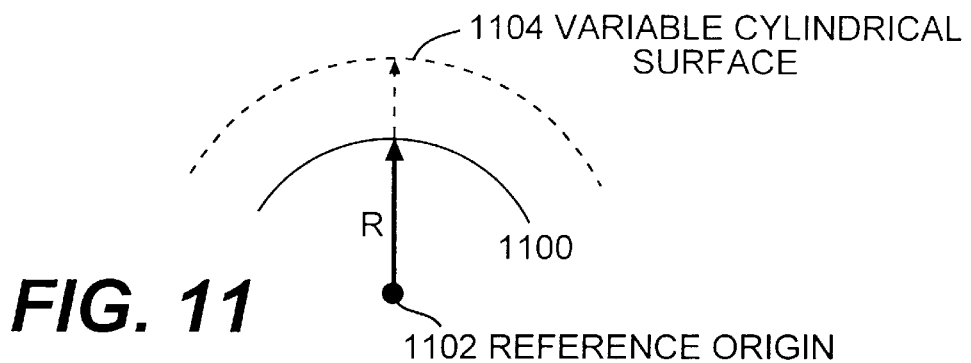
FIG. 11 is a diagram illustrating a radial dimension defined in accordance with the present invention.

A radial dimension in accordance with the present invention is illustrated in FIG. 11. Radial dimension 1100 is defined by a fixed origin 1102, from which emanates arc 1104, which defines the variable cylindrical surface of the radial dimension.

Figure 12A:
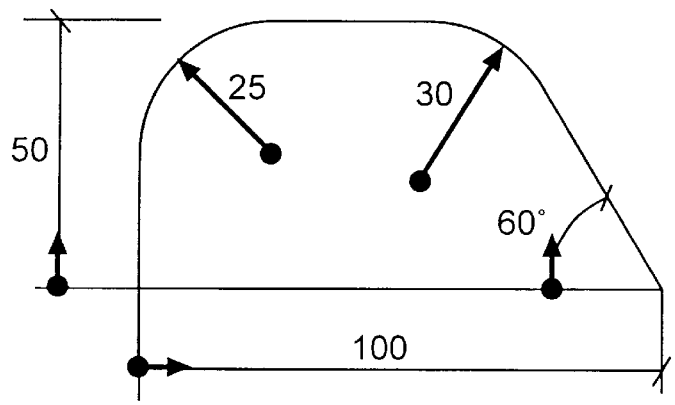
FIGS. 12A and 12B are diagrams illustrating an object defined with radial dimensions.
Figure 12B:
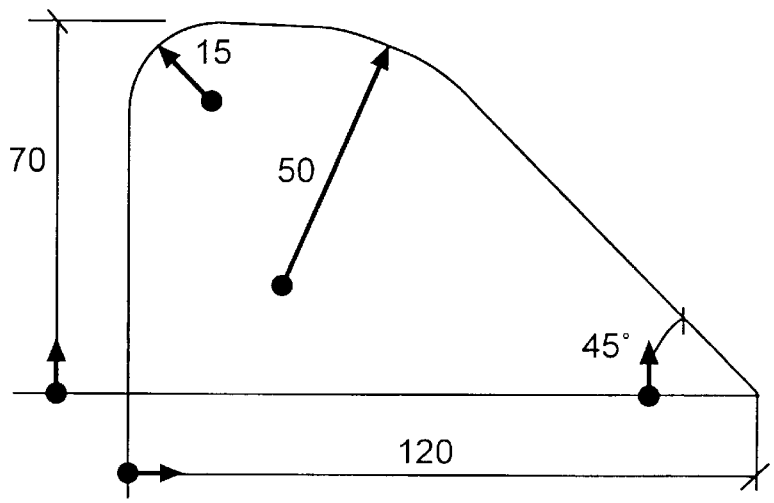

FIG. 12A illustrates an object defined with linear, radial, and angular dimensions. In FIG. 12A, the arcs defined by the radial dimensions have been specified by the drafter as fillet arcs, which are arcs defined relative to two lines such that each side of the arc terminates at the tangent point of one of the lines. FIG. 12B illustrates the object of FIG. 12A after the linear and angular dimensions have been modified by the drafter as indicated. In response to the change in the lines which define the fillet arcs, the parametric dimensioning engine automatically recalculates the fillet arcs so that the lines adjacent to the arcs join the arc at tangent points.

Figure 13A:
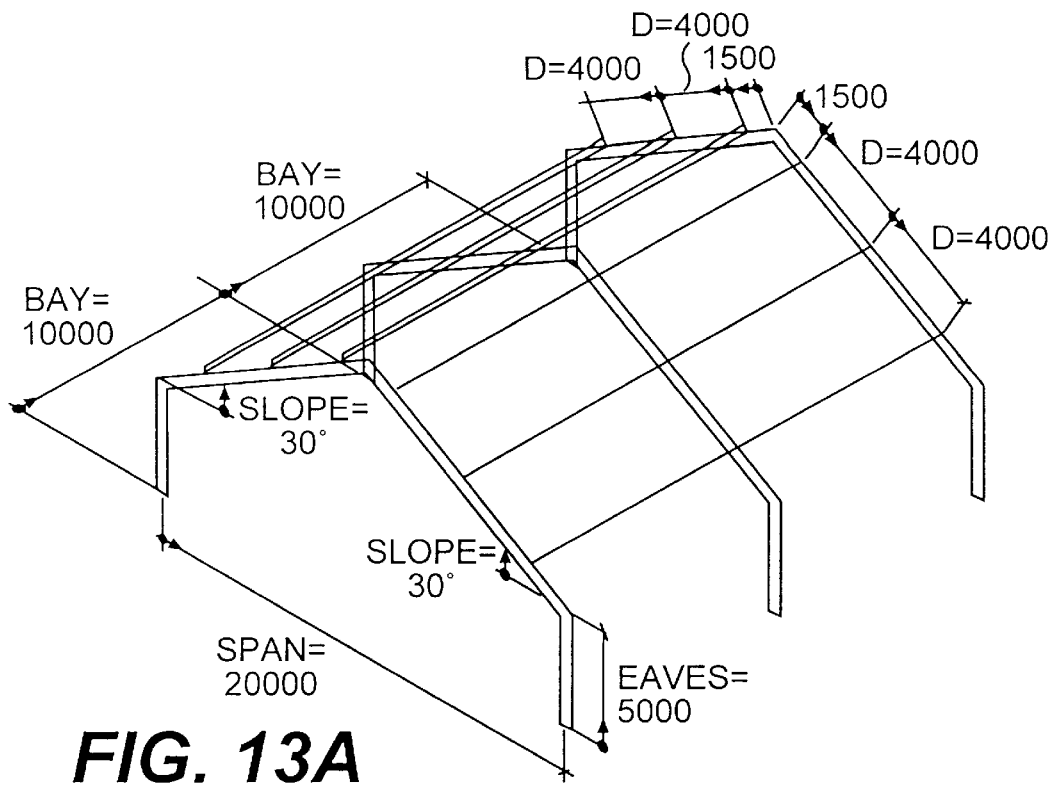
FIGS. 13A and 13B are diagrams illustrating a three-dimensional object defined with angular and linear dimensions.
Figure 13B:
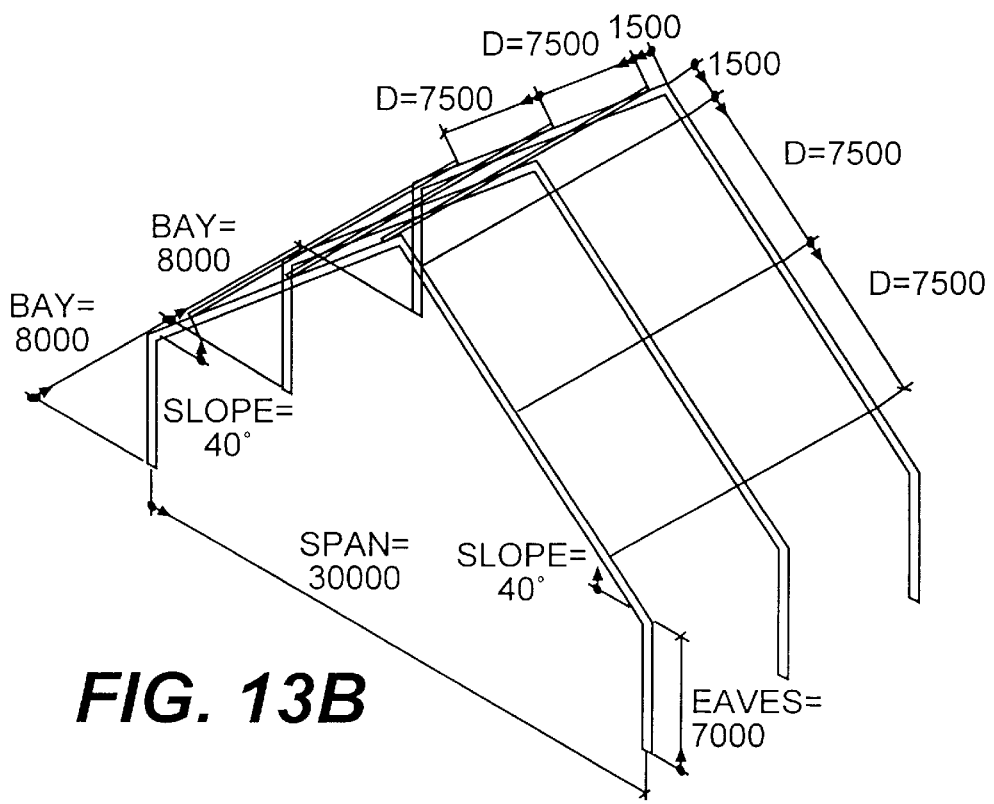

FIG. 13A illustrates a three-dimensional object defined with linear and angular dimensions in accordance with the present invention. FIG. 13B illustrates the object of FIG. 13A after the drafter has changed the values of the variables "bay," "span", "d", "slope", and "eaves," and regenerated the object with parametric dimensioning engine 308.

Figure 14:
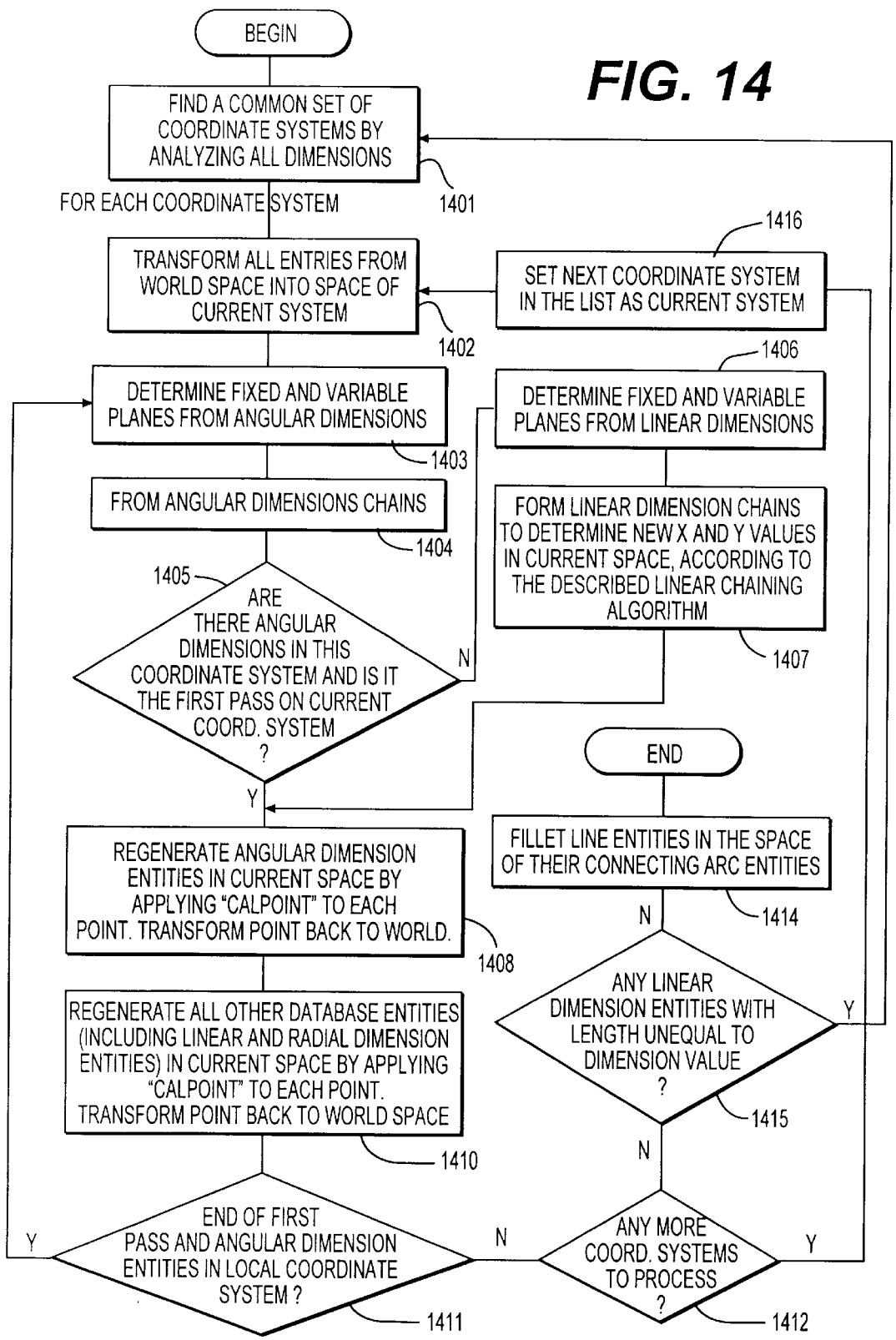
FIGS. 14 and 16 are flowcharts illustrating the operation of the parametric dimensioning engine according to the present invention.

Up to this point, the operation of parametric dimensioning engine 308 has been illustrated primarily by example, with reference to various objects re-drafted based on modifications to the dimension entities of the objects. FIG. 14 is a flowchart showing a more detailed description of the algorithm used by parametric dimensioning engine 308.

Parametric dimensioning engine 308 begins by identifying local coordinate systems within a CAD object (step 1401), where each local coordinate system is a coordinate system defined to include the set of linear dimension entities having variable planes that are parallel or orthogonal to one another. After identifying the various local coordinate systems, the parametric dimensioning engine maps the coordinate data of each entity from global or world space into the current local coordinate system (1402). A conventional transform matrix is used to map the entities from global space to local coordinate space. The transform matrix is selected such that a first set of dimension entities with parallel variable planes are aligned along one axis in local coordinate space ("the local X axis") and the entities orthogonal to the first set are aligned along a second axis, orthogonal to the first, in local coordinate space ("the local Y axis"). When mapping entities from a three-dimensional CAD model, a local Z axis would also be present. However, the value of the local Z coordinate is not modified by the parametric dimensioning engine.

Figure 15A:
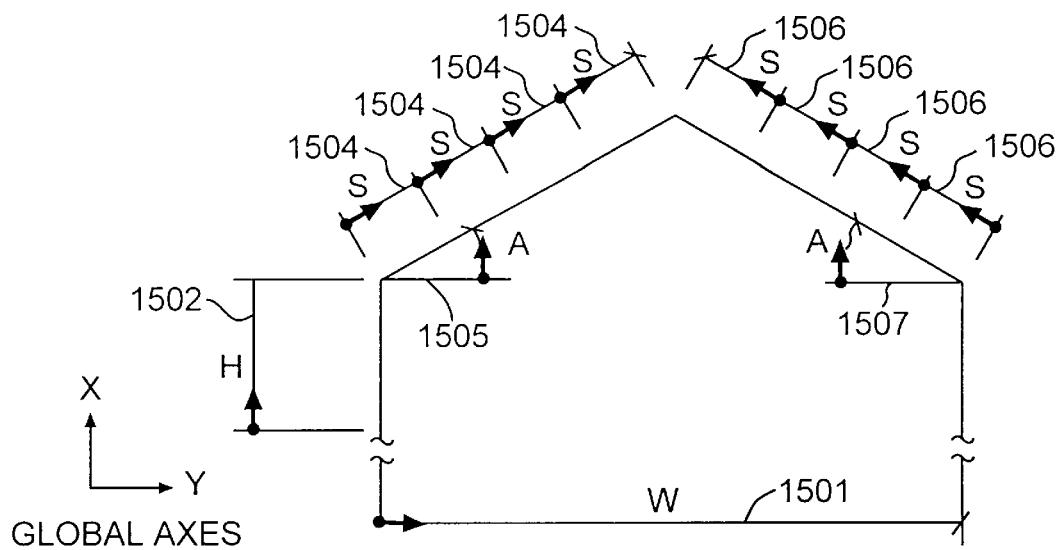
FIGS. 15A and 15B are diagrams used to illustrate local coordinate systems defined according to the present invention.

The definition of local coordinate systems will be further explained with reference to FIGS. 15A and 15B. FIG. 15A is a two-dimensional object having linear dimension entities 1501, 1502, 1504, and 1506, and angular dimension entities 1505 and 1507. For this drawing, three local coordinate systems are present: (1) linear dimension entities 1501 and 1502 (variable planes orthogonal to one another), (2) linear dimension entities 1504 (variable planes parallel with one another) and (3) linear dimension entities 1506 (variable planes parallel with one another). Angular dimension entities 1505 and 1507 are considered present in each local coordinate system in which the plane defined by the local X and Y axes are parallel to the angular dimension entity. In the case of a two-dimensional object, such as the object of FIG. 15A, this will usually include each local coordinate system.

In an object having no linear dimension entities, the parametric dimensioning engine forms a single local coordinate system based on any defined angular dimension entities.

Figure 15B:
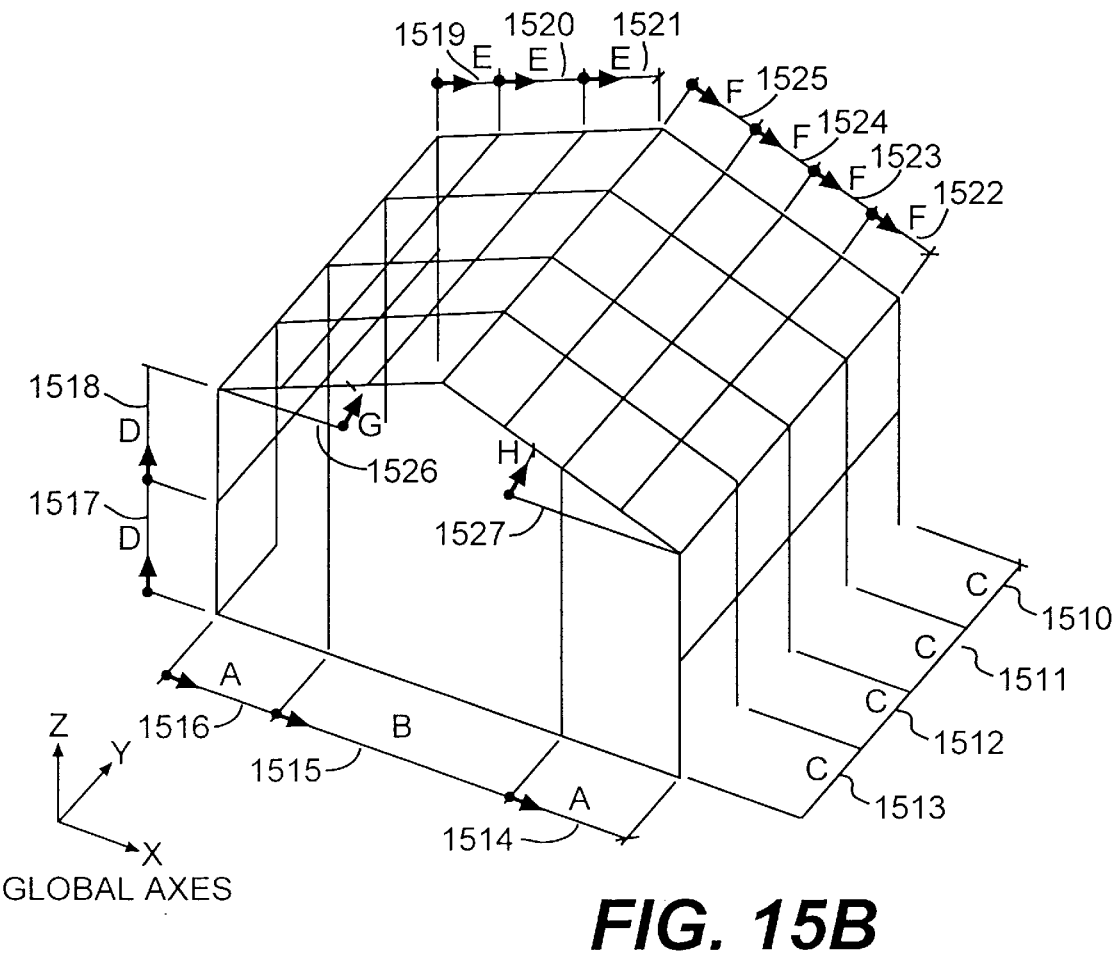

FIG. 15B is a three-dimensional object having linear dimension entities 1510 through 1525 and angular dimension entities 1526 and 1527. Four local coordinate systems are present in FIG. 15B: (1) linear dimension entities 1517 and 1518 (variable planes parallel), (2) linear dimension entities 1519 through 1521 (variable planes parallel), (3) linear dimension entities 1522 through 1525 (variable planes parallel), and (4) linear dimension entities 1510 through 1516. In local coordinate system (4), the variable planes of linear dimension entities 1514 through 1516 are parallel with one another and orthogonal to the variable planes of entities 1510 through 1513. Angular dimension entities 1526 and 1527 are present in local coordinate systems (1) through (3).

Note that although the variable planes of linear dimension entities 1510 through 1513, 1514 through 1516, and 1517 through 1518 are all orthogonal to one another, two separate local coordinate systems have been defined. This is necessary because, as mentioned previously, within each local coordinate system, parametric dimensioning engine 308 only modifies local X and local Y values of each entity, but not the local Z values. Accordingly, in order to ensure that a point in global space can be modified in all three dimensions (X, Y, and Z), the local coordinate systems are further limited to include only dimension entities that have dimension lines and leader lines in parallel planes.

Returning now to FIG. 14, for each current local coordinate space, the dimensioning engine analyzes the angular dimension entities and forms any existing angular dimension chains (steps 1403 and 1404). However, if no angular dimensions are in the current local coordinate space, the dimensioning engine analyzes any local linear dimension entities and forms linear dimension chains, preferably using the method shown in FIG. 7 (steps 1405, 1406, and 1407). Based on the formed linear dimension chains, the "calpoint" routine ("calpoint" is described below with reference to FIG. 16) is applied to the entities in the current local coordinate system (step 1410).

If angular dimension entities are present in the current local coordinate system, the loop defined by steps 1403–1411 is repeated twice. Because a change in an angular dimension may alter the space of other dimensions, linear chaining is not performed in the first pass. Instead, only the angular rotations are applied (step 1404), and the new entity coordinates are then calculated by "calpoint" (steps 1408 and 1410). On the second pass all entities will have been rotated into the correct space by the first pass and the linear dimension chains can now be applied, as described in the previous paragraph, to determine the new local X and Y values.

After the second pass is complete, the two-pass procedure defined by steps 1403–1411 is repeated for each coordinate system (steps 1412 and 1416). When all the coordinate systems have been processed, and when the check at step 1415 is not satisfied, fillet lines are connected with their arcs (step 1414).

In step 1415, the dimensioning engine determines if lengths of the linear dimension entities equal their dimension value. When the parametric dimensioning engine rotates dimension entities (step 1408), linear dimensions may no longer lie along a local X or Y axis in the current coordinate system, in which case, the linear chaining algorithm (steps 1406 and 1407) can not be applied. In this situation, the linear dimension entity lengths do not all equal their dimension values. Accordingly, the dimensioning engine begins the dimensioning process over at step 1401. In the second repetition of the process, the angular rotations will already have been applied, and the linear dimensions will all be determined in their correct local coordinate space.

Figure 16:
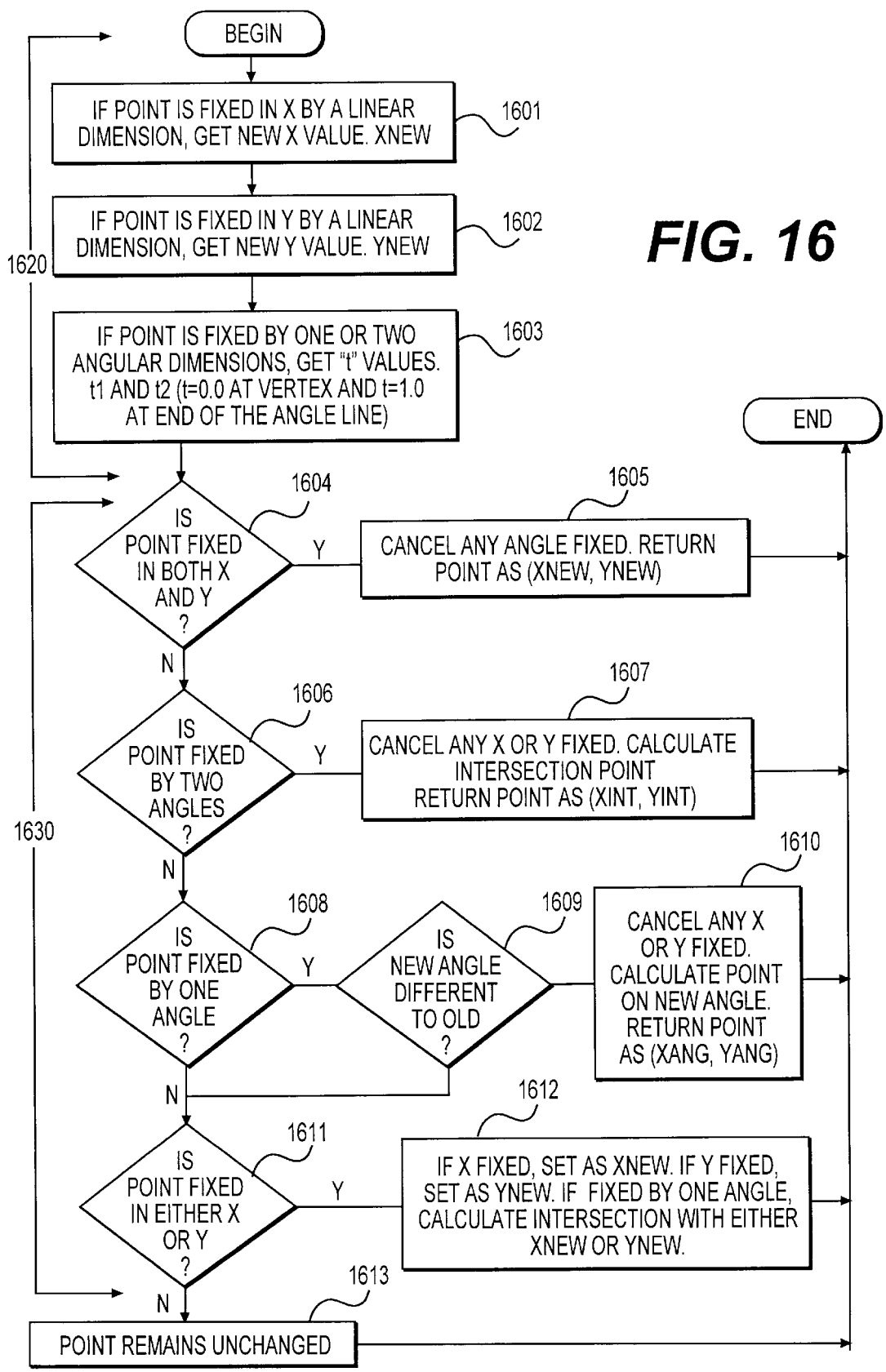

FIG. 16 is a flowchart of the "calpoint" routine for recalculating new coordinate values of points in the local coordinate systems. The "calpoint" routine is executed for each point to be regenerated, and includes a section 1620 that recalculates a point's coordinates based on its angular and/or linear dimensions, and a section 1630, which resolves inconsistencies between dimensions defined by the drafter. An inconsistency can occur if the drafter defines a point fixed by multiple dimensions that ostensibly require the point to be at different coordinates.

Section 1620 includes three steps. If the point is defined by a horizontal dimension line, a new x value, called xnew, is calculated for the point (step 1601). If the point is defined by a vertical dimension line, a new y value, called ynew, is calculated for the point (step 1602). If the point is fixed by angular dimensions, the dimensioning engine calculates the "t" values of the point ("t" values refer to the relative location of the point on a line, a "t" value of zero means the point is at the beginning of the line, a "t" value of 1.0 indicates the point is at the end of the line) (step 1603).

After the point's coordinate data is recalculated in section 1620, the steps in section 1630 resolve inconsistencies and assign a final coordinate value to the point. If the point is fixed both horizontally and vertically, any angle values calculated in step 1603 are canceled (steps 1604, 1605) and the new point value (xnew, ynew) is returned. If the point is fixed by two angles, any values calculated in steps 1601 and 1602 are ignored, and the new point coordinate value is determined by calculating the intersection of the lines of the two angles (steps 1606, 1607). If neither the conditions in steps 1604 and 1606 are met, and the point is fixed by a single angle (step 1608), and the new angle is different than the previous angle (step 1609), any values calculated in steps 1601 and 1602 are ignored, and the new point coordinates are determined based on the single angle (step 1610). Finally, if the point is simply fixed either horizontally or vertically, either xnew, ynew, or the intersection of the point (if fixed by one angle), is calculated (steps 1611, 1612). If none of the conditions in steps 1604, 1606, 1608, or 1611 are satisfied, the point remains unchanged (step 1613).

Although the steps in section 1630 resolve inconsistencies by giving points fixed in both x and y highest priority (step 1604), the method could alternatively be implemented such that angular dimensions (step 1606) have priority over linear dimensions. Preferably, whether to give higher priority to linear or angular dimensions is an option selectable by the drafter.

As described above, the parametric dimensioning engine of the present invention identifies multiple local coordinate systems for each CAD object and modifies the entities within the local coordinate systems based on changes in the dimension entities defined according to the present invention. The modified entity coordinates are then mapped back to the global space of the CAD object. The described parametric dimensioning engine and dimension entities of the present invention make possible an extremely powerful and flexible CAD dimensioning system.

It will be apparent to those skilled in the art that various modifications and variations can be made to the present invention without departing from the scope or spirit of the invention. For example, although the invention has been described in relation to a CAD system, the dimensioning scheme may be applied to any drafting, drawing, modeling, or graphics based system, whether or not computer implemented.

Other embodiments of the invention will be apparent to those skilled in the art from consideration of the specification and practice of the invention disclosed herein. The specification and examples are exemplary only. The true scope and spirit of the invention is instead indicated by the claims and their equivalents.

TABLE I

| Term | Definition |
| --- | --- |
| DIMENSION | A measure of spatial extent. Dimensions are used to show the geometric measurements of objects and the distances or angles between objects. The three basic types of dimensions used in drafting are linear, angular and radial. |
| ENTITY | An object, such as a line, circle, arc, polyline, dimension, or text, treated as a single element for creation, manipulation and modification. Entities are the fundamental building blocks used within a CAD system to represent an object or objects. |
| DIMENSION ENTITY | The set of constructs which constitute a dimension within a CAD system. A dimension entity is comprised of: (1) A dimension line that indicates the direction and extent of the dimension. For angular dimensioning, the dimension line is an arc. (2) Leader lines (also called extension lines, projection lines or witness lines) that extend from the feature being dimensioned to the dimension line. (3) An arrowhead (also called termination symbols) added to each end of the dimension line. (4) Dimension text, which is a text string that usually indicates the actual measurement. |
| GLOBAL COORDINATE SYSTEM | Also referred to as the World coordinate system. The coordinate system is used as the basis for defining all objects and other coordinate systems. |
| LOCAL COORDINATE SYSTEM | A user defined coordinate system that defines the origin and orientation of X, Y and Z axes in three dimensional space. |
| CAD OBJECT | One or more primitives, such as text, dimensions, line, circle, arc, or polyline used to represent a product or real world object of some description. (e.g., Mechanical part, component, building, etc.) A two-dimensional object is typically called a drawing while a three-dimensional object is referred to as a model. |

What is claimed is:

1. A computer system comprising:
   a processor for executing a program to form a chain of related dimension entities by repetitively comparing the dimension entities to one another and to sequentially modify coordinate information of the dimension entities in a formed chain such that a modification of a subsequent dimension entity in the chain is influenced by modifications to previous dimension entities in the chain;

a display device coupled to the processor, the display device displaying the dimension entities; and a computer memory coupled to the processor for storing the program.

2. The computer system of claim 1, wherein the computer memory further stores a data structure comprising:

a first field specifying an origin of a dimension in each said dimension entity as one of a start, mid-point, or end;

a second field specifying the coordinate information of each said dimension; and a third field specifying a value of the dimension in each said dimension entity.

3. The computer system of claim 2, wherein the third field holds a length of the dimension.

4. The computer system of claim 3, wherein the length held by the third field is a parameter or expression evaluated by the processor when the program to modify coordinate information is executed.

5. The computer system of claim 2, wherein the third field holds an angle of the dimension.

6. The computer system of claim 5, wherein the angle held by the third field is a parameter or expression evaluated by the processor when the program to modify coordinate information is executed.

7. A method of updating dimension entities of an object in a computer aided design (CAD) program, each dimension entity having coordinate data, the method comprising the steps of:

forming chains of related dimension entities corresponding to at least one of a linear, angular, or radial object;

sequentially recalculating the coordinate data of the dimension entities in a selected chain such that a modification of a subsequent dimension entity in the selected chain is influenced by modifications to previous dimension entities in the chain; and redrawing the entities on a computer display based on the modified dimensions.

8. The method of claim 7, wherein the step of forming a chain further includes comparing a variable plane of a dimension defined by a first dimension entity to a reference plane of a dimension defined by a second dimension entity.

9. The method of claim 8, wherein the step of forming a chain further includes the step of repetitively comparing the dimension entities to one another.

10. A data structure stored in a computer-readable medium for storing dimension information for each of a plurality of entities as a dimension entity, the dimension entities each including:

a first field specifying an origin as one of a start, mid-point, or end;

a second field specifying coordinate information of the dimension entity; and a third field specifying a value.

11. The data structure of claim 10, wherein the third field holds a length of a dimension.

12. The data structure of claim 10, wherein the third field holds an angle of a dimension.

13. A computer program stored on a computer-readable medium, the computer program including instructions for a method of updating dimension entities of an object in a computer aided design (CAD) program, each dimension entity having coordinate data, the method comprising the steps of:

forming chains of related dimension entities corresponding to at least one of a linear, angular, or radial object; and sequentially recalculating the coordinate data of the dimension entities in a selected chain such that a modification of a subsequent dimension entity in the selected chain is influenced by modifications to previous dimension entities in the chain.

14. The computer-readable medium of claim 13, further including instructions for performing the method wherein the step of forming chains further includes comparing a variable plane of a dimension defined by a first dimension entity to a reference plane of a dimension defined by a second dimension entity.

15. The computer-readable medium of claim 14, further including instructions for performing the method wherein the step of forming chains further includes the step of repetitively comparing the dimensions entities to one another.

16. A method of recalculating coordinate information of entities in a CAD object defined in a global coordinate system, the method comprising the steps of:

identifying at least one local coordinate system;

transforming the coordinates of the entities in the CAD object to a selected one of the identified local coordinate systems;

forming angular dimension entity chains in the selected local coordinate system;

forming linear dimension entity chains in the selected local coordinate system;

regenerating the coordinate information of the entities in the selected local coordinate system based on the formed angular and linear dimension entity chains; and transforming the regenerated coordinate information in the selected local coordinate system to the global coordinate system.

17. The method of claim 16, wherein a plurality of local coordinate systems are identified.

18. The method of claim 16, wherein the transforming, forming, and regenerating steps are performed for each identified local coordinate system.

19. A computer program stored on a computer-readable medium, the computer program including instructions for recalculating coordinate information of entities in a CAD object defined in a global coordinate system, the method comprising the steps of:

identifying at least one local coordinate system;

transforming the coordinates of the entities in the CAD object to a selected one of the identified local coordinate systems;

forming angular dimension entity chains in the selected local coordinate system;

forming linear dimension entity chains in the selected local coordinate system;

regenerating the coordinate information of the entities in the selected local coordinate system based on the formed angular and linear dimension entity chains; and transforming the regenerated coordinate information in the selected local coordinate system to the global coordinate system.

20. The computer program of claim 19, further including instructions for identifying a plurality of local coordinate systems.

21. The computer program of claim 19, further including instructions for repeating the transforming, forming, and regenerating steps for each identified local coordinate system.

* * * * *